United States Patent [19]

Ogle

[11] 4,177,779
[45] Dec. 11, 1979

[54] FUEL ECONOMY SYSTEM FOR AN INTERNAL COMBUSTION ENGINE

[76] Inventor: Thomas H. W. W. P. Ogle, 9028 Mt. Delano, El Paso, Tex. 79924

[21] Appl. No.: 817,243

[22] Filed: Jul. 20, 1977

[51] Int. Cl.² .......................................... F02M 31/00
[52] U.S. Cl. ................................ 123/133; 123/134
[58] Field of Search ............... 123/133, 34 A, 122 E, 123/134, 136; 48/180 R; 261/144, 145

[56] References Cited

U.S. PATENT DOCUMENTS

| 1,051,122 | 1/1913 | Krayer | 123/134 |
|---|---|---|---|
| 1,530,882 | 3/1925 | Chapin | 123/134 |
| 2,312,151 | 2/1943 | Crabtree | 123/119 |
| 3,001,519 | 9/1961 | Dietrich | 123/136 |
| 3,221,724 | 12/1965 | Wentworth | 123/136 |
| 3,395,681 | 8/1968 | Walker | 123/119 |
| 3,633,533 | 1/1972 | Holzappfel | 123/119 A |
| 3,713,429 | 1/1973 | Dwyre | 123/133 |
| 3,716,040 | 2/1973 | Herpin | 123/198 A |
| 3,728,092 | 4/1973 | Gorman | 48/102 R |
| 3,749,376 | 7/1973 | Alm | 261/18 A |
| 3,752,134 | 8/1973 | Hollis | 123/136 |
| 3,759,234 | 9/1973 | Buckton | 123/136 |
| 3,817,233 | 6/1974 | Kihn | 123/133 |
| 3,851,633 | 12/1974 | Shih | 123/133 |
| 3,854,463 | 12/1974 | Burden, Sr. | 123/133 |
| 3,874,353 | 4/1975 | Wooldridge | 123/134 |
| 3,888,223 | 6/1975 | Mondt | 123/136 |
| 3,907,946 | 9/1975 | Brown | 261/142 |
| 3,911,881 | 10/1975 | Lee | 123/122 AB |
| 3,931,801 | 1/1976 | Rose | 123/134 |
| 3,945,352 | 3/1976 | Reimuller | 123/34 A |
| 3,968,775 | 7/1976 | Harpman | 123/34 A |
| 4,003,356 | 1/1977 | Naylor | 123/122 E |
| 4,011,847 | 3/1977 | Fortino | 123/134 |
| 4,015,569 | 4/1977 | Leshner | 123/133 |
| 4,015,570 | 4/1977 | Sommerville | 123/133 |

FOREIGN PATENT DOCUMENTS 514050  6/1955  Canada ..................................... 123/133

Primary Examiner—Ronald H. Lazarus
Attorney, Agent, or Firm—Berman, Aisenberg & Platt

[57] ABSTRACT

A fuel economy system for an internal combustion engine which, when installed in a motor vehicle, obviates the need for a conventional carburetor, fuel pump and gasoline tank. The system operates by using the engine vacuum to draw fuel vapors from a vapor tank through a vapor conduit to a vapor equalizer which is positioned directly over the intake manifold of the engine. The vapor tank is constructed of heavy duty steel or the like to withstand the large vacuum pressure and includes an air inlet valve coupled for control to the accelerator pedal. The vapor equalizer ensures distribution of the correct mixture of air and vapor to the cylinders of the engine for combustion, and also includes its own air inlet valve coupled for control to the accelerator pedal. The system utilizes vapor-retarding filters in the vapor conduit, vapor tank and vapor equalizer to deliver the correct vapor/air mixture for proper operation. The vapor tank and fuel contained therein are heated by running the engine coolant through a conduit within the tank. Due to the extremely lean fuel mixtures used by the present invention, gas mileage in excess of one hundred miles per gallon may be achieved.

32 Claims, 11 Drawing Figures

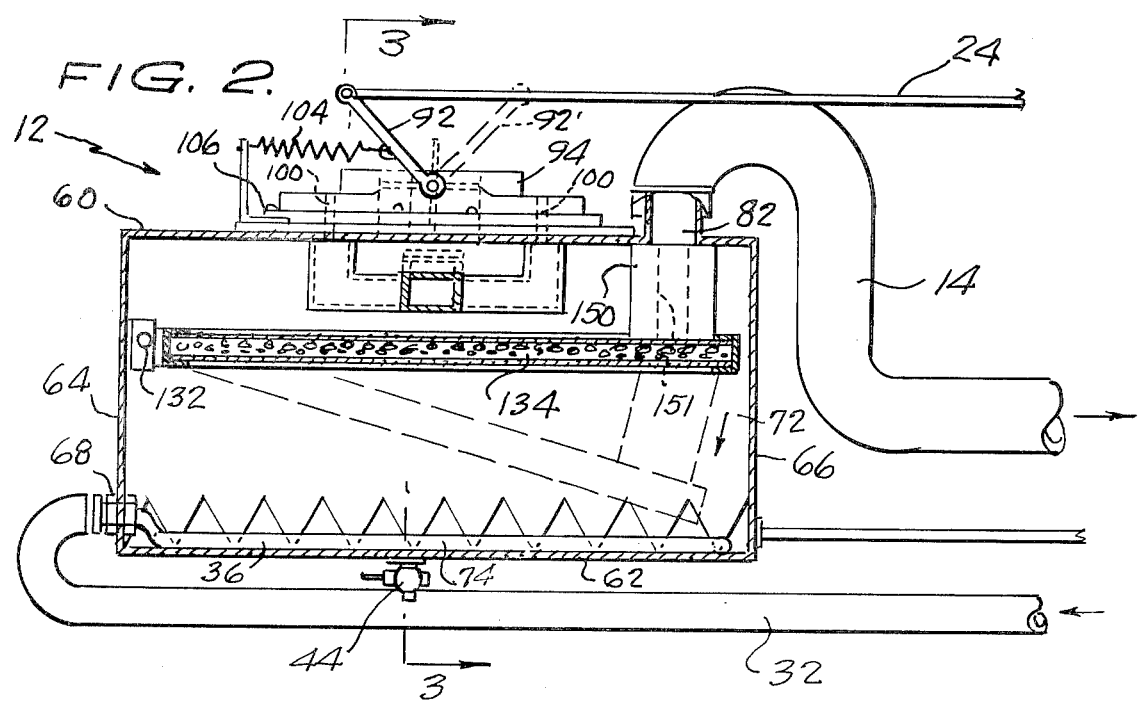
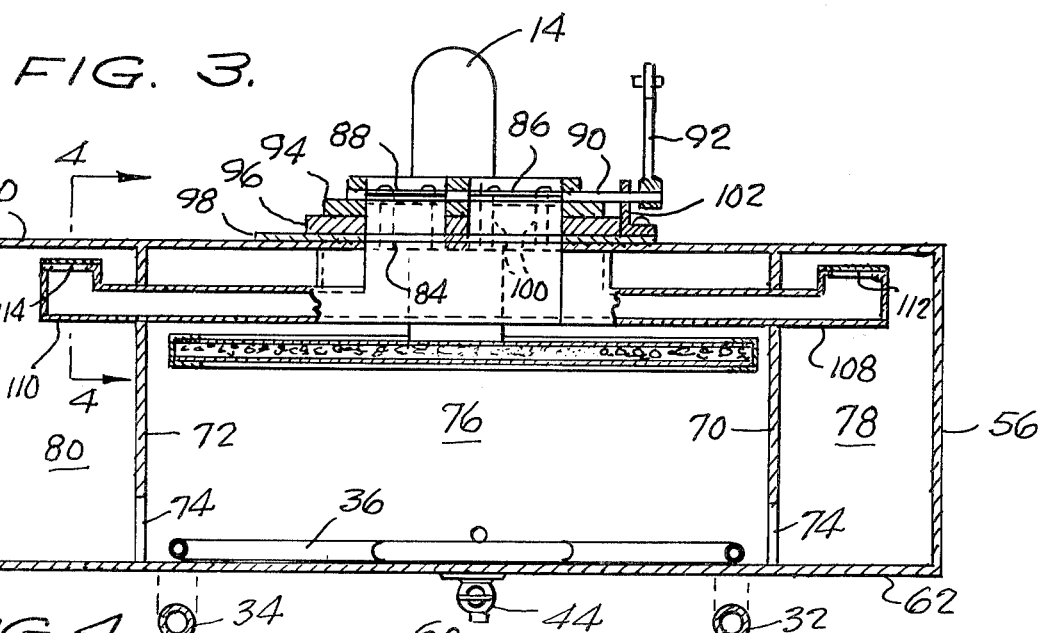
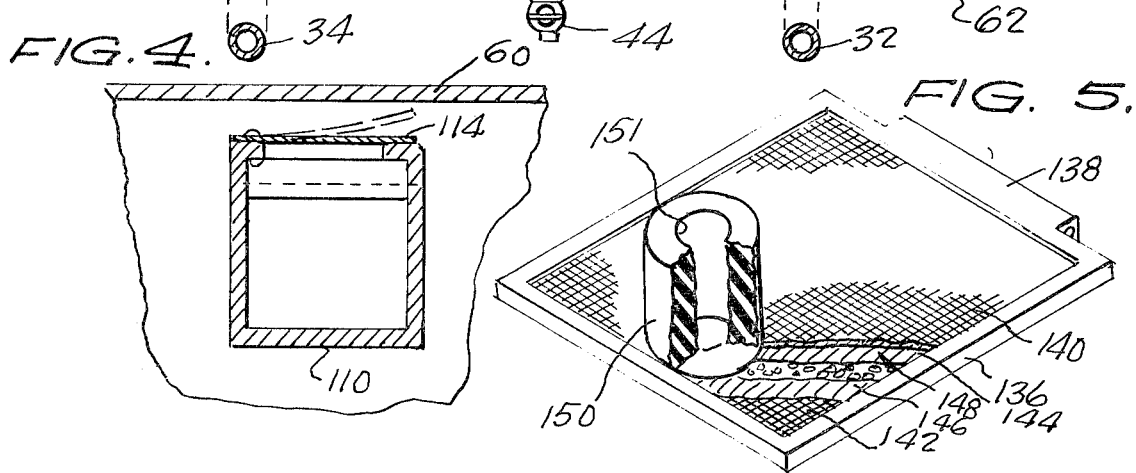

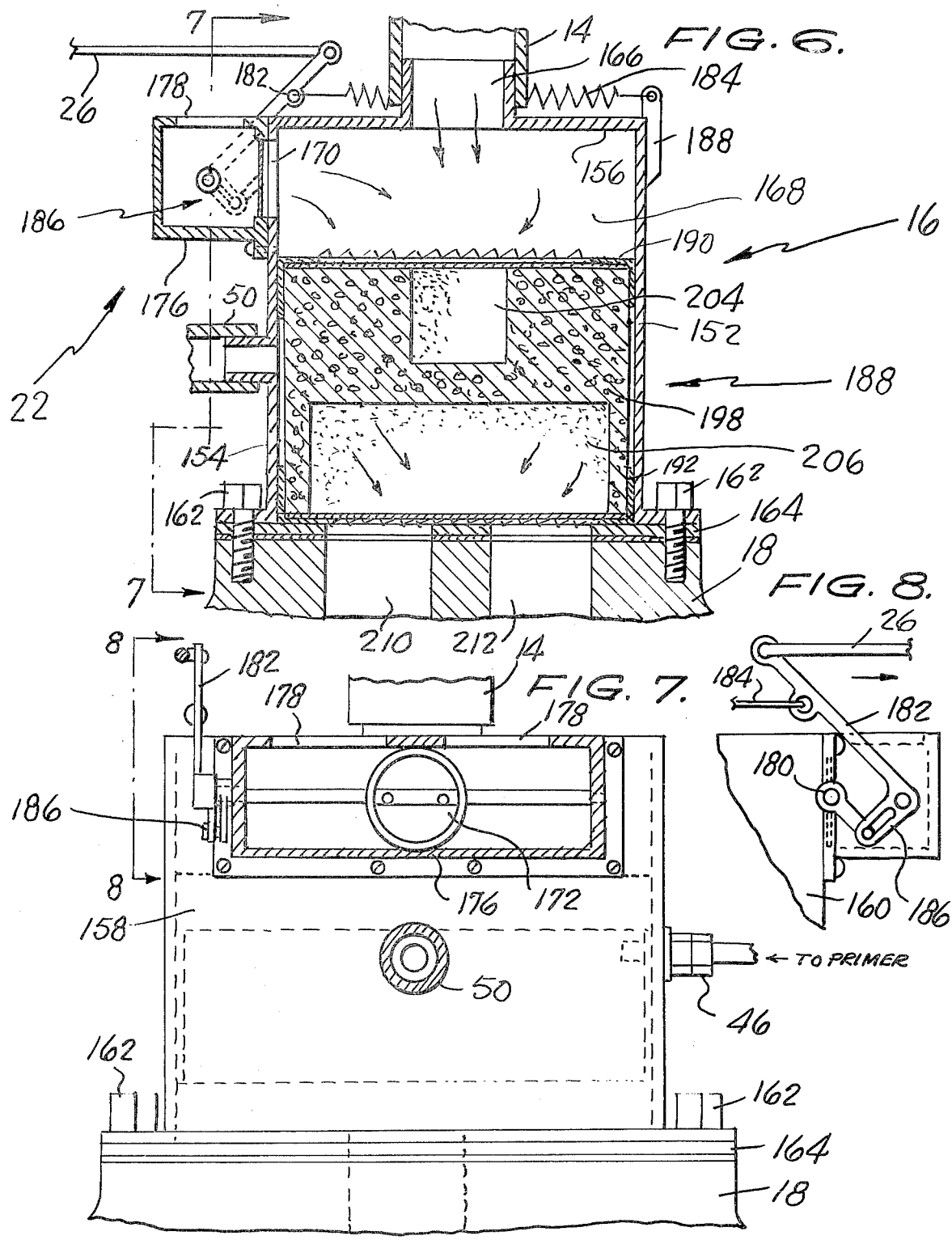

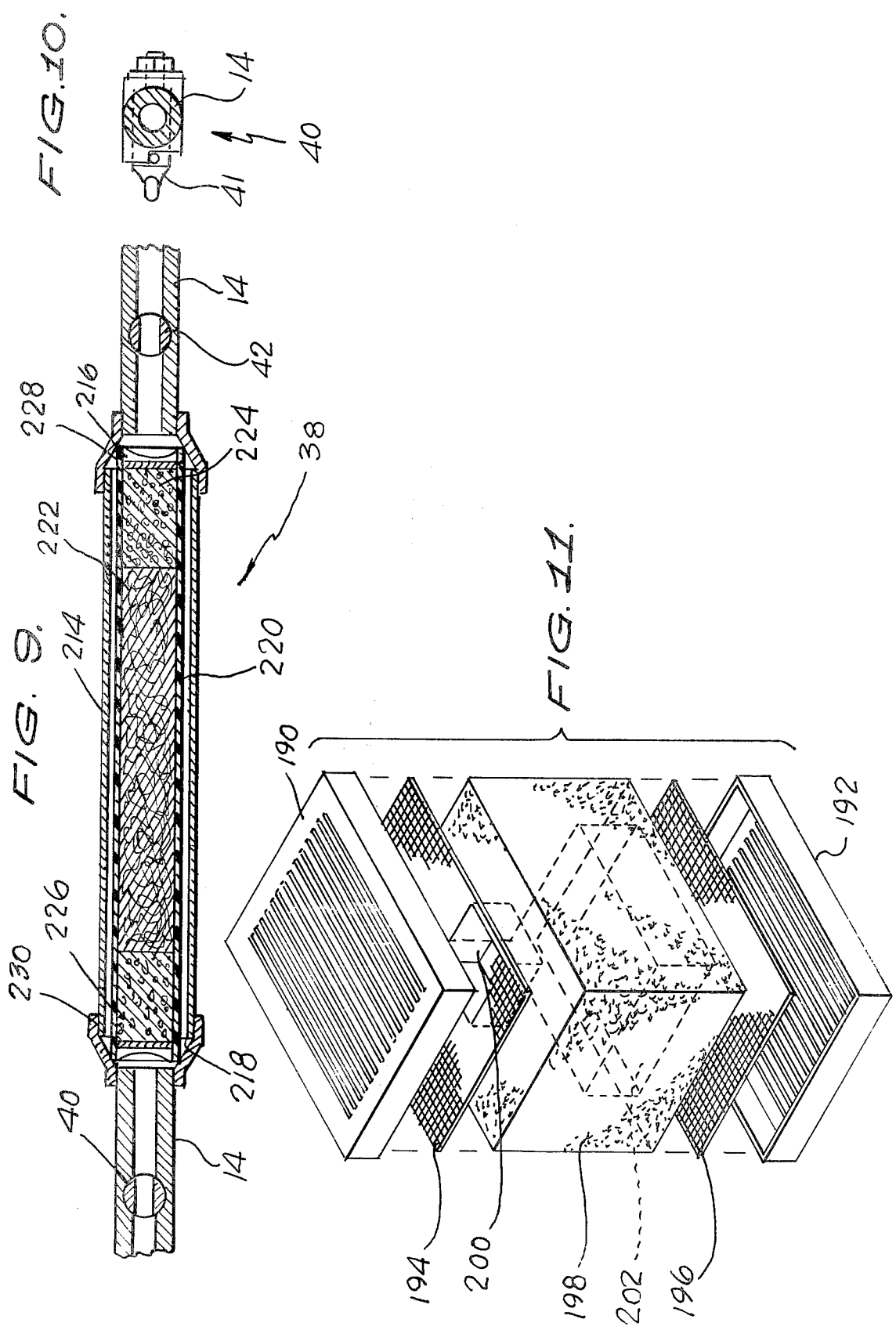

FUEL ECONOMY SYSTEM FOR AN INTERNAL COMBUSTION ENGINE

BACKGROUND OF THE INVENTION

1. Field of the Invention

The present invention is related to internal combustion engines and, more particularly, is directed towards a fuel economy system for an internal combustion engine which, when applied to a motor vehicle, obviates the need for conventional carburetors, fuel pumps and gasoline tanks, and enables vastly improved gas mileage to be obtained.

2. Description of the Prior Art

The prior art evidences many different approaches to the problem of increasing the efficiency of an internal combustion engine. Due to the rising price of gasoline, and the popularity of motor vehicles as a mode of transportation, much of the effort in this area is generally directed towards increasing gas mileage for motor vehicles. Along with increased gas mileage, much work has been done with a view towards reducing pollutant emissions from motor vehicles.

I am aware of the following United States patents which are generally directed towards systems for improving the efficiency and/or reducing the pollutant emissions of internal combustion engines:

| | |
|---|---|
| Chapin | 1,530,882 |
| Crabtree et al | 2,312,151 |
| Hietrich et al | 3,001,519 |
| Hall | 3,191,587 |
| Wentworth | 3,221,724 |
| Walker | 3,395,681 |
| Holzappfel | 3,633,533 |
| Dwyre | 3,713,429 |
| Herpin | 3,716,040 |
| Gorman, Jr. | 3,728,092 |
| Alm et al | 3,749,376 |
| Hollis, Jr. | 3,752,134 |
| Buckton et al | 3,759,234 |
| Kihn | 3,817,233 |
| Shih | 3,851,633 |
| Burden, Sr. | 3,854,463 |
| Woolridge | 3,874,353 |
| Mondt | 3,888,223 |
| Brown | 3,907,946 |
| Lee, Jr. | 3,911,881 |
| Rose et al | 3,931,801 |
| Reimuller | 3,945,352 |
| Harpman | 3,968,775 |
| Naylor | 4,003,356 |
| Fortino | 4,011,847 |
| Leshner et al | 4,015,569 |
| Sommerville | 4,015,570 |

The Chapin U.S. Pat. No. (1,530,882) discloses a gasoline tank surrounded by a water jacket, the latter of which is included in a circulation system with the radiator of the automobile. The heated water in the circulation system causes the fuel in the gasoline tank to readily vaporize. Suction from the inlet manifold causes air to be drawn into the tank to bubble air through the gasoline to help form the desired vapor which is then drawn to the manifold for combustion.

The Buckton et al U.S. Pat. No. (3,759,234) advances a fuel system which provides supplementary vapors for an internal combustion engine by means of a canister that contains a bed of charcoal granules. The Wentworth and Hietrich et al U.S. Pat. Nos. (3,221,724 and 3,001,519) also teach vapor recovery systems which utilize filters of charcoal granules or the like.

The Dwyre U.S. Pat. No. (3,713,429) uses, in addition to the normal fuel tank and carburetor, an auxiliary tank having a chamber at the bottom thereof which is designed to receive coolant from the engine cooling system for producing gasoline vapors, while the Walker U.S. Pat. No. (3,395,681) discloses a fuel evaporator system which includes a gasoline tank intended to replace the normal gasoline tank, and which includes a fresh air conduit 22 for drawing air into the tank.

The Fortino U.S. Pat. No. (4,011,847) teaches a fuel supply system wherein the gasoline is vaporized primarily by atmospheric air which is released below the level of the gasoline, while the Crabtree et al U.S. Pat. No. (2,312,151) teaches a vaporization system which includes a gas and air inlet port located in a vaporizing chamber and which includes a set of baffles for effecting a mixture of the air and vapor within the tank. The Mondt U.S. Pat. No. (3,888,223) also discloses an evaporative control canister 48 for improving cold start operation and emissions, while Sommerville U.S. Pat. No. (4,015,570) teaches a liquid-fuel vaporizer which is intended to replace the conventional fuel pump and carburetor that is designed to mechanically change liquid gasoline to a vapor state.

While the foregoing patents evidence a proliferation of attempts to increase the efficiency and/or reduce pollutant emissions from internal combustion engines, no practical system has yet found its way to the marketplace.

OBJECTS AND SUMMARY OF THE INVENTION

It is therefore a primary object of the present invention to provide a new and improved fuel economy system for an internal combustion engine which greatly improves the efficiency of the engine.

Another object of the present invention is to provide a unique fuel economy system for an internal combustion engine which provides a practical, operative and readily realizable means for dramatically increasing the gas mileage of conventional motor vehicles.

A further object of the present invention is to provide an improved fuel economy system for internal combustion engines which also reduces the pollutant emissions.

The foregoing and other objects are attained in accordance with one aspect of the present invention through the provision of a fuel vapor system for an internal combustion engine having an intake manifold, which comprises tank means for containing fuel vapor, vapor equalizer means mounted on and in fluid communication with the intake manifold of the engine, and vapor conduit means which connect the tank means to the vapor equalizer means for delivering fuel vapor from the former to the latter. The vapor equalizer means includes a first valve means connected thereto for controlling the admission of air to the vapor equalizer means, while the tank means has a second valve means connected thereto for controlling the admission of air to the tank means. A throttle controls the first and second valve means so that the opening of the first valve means proceeds and exceeds the opening of the second valve means during operation.

In accordance with other aspects of the present invention, filter means are positioned in the vapor conduit means for retarding the flow of fuel vapor from the tank means to the vapor equalizer means. In a preferred form, the filter means comprises carbon particles and may include a sponge-like collection of, for example, neoprene fibers. In a preferred embodiment, the filter means comprises a substantially tubular housing positioned in series in the vapor conduit, the housing containing a central portion comprising a mixture of carbon and neoprene and end portions comprising carbon positioned on each side of the central portion.

In accordance with another aspect of the present invention, a second filter means is positioned in the vapor equalizer means for again retarding the flow of the fuel vapor to the engine intake manifold. The second filter means is positioned downstream of the first valve means and in a preferred form includes carbon particles mounted in a pair of recesses formed in a porous support member. The porous support member, which may comprise neoprene, includes a first recessed portion positioned opposite a vapor inlet port in the vapor equalizer means to which the vapor conduit means is connected, while a second recessed portion is positioned opposite the intake manifold of the engine.

In accordance with still other aspects of the present invention, a third filter means is positioned in the tank means for controlling the flow of fuel vapor into the vapor conduit means in proportion to the degree of vacuum in the tank means. The filter means more particularly comprises means for reducing the amount of fuel vapor delivered to the vapor conduit means when the engine is idling and when the engine has attained a steady speed. The throttle means acts to close the second valve means when the engine is idling and when the engine has attained a steady speed to thereby increase the vacuum pressure in the tank means. In a preferred form, the third filter means comprises a frame pivotally mounted within the tank means and movable between first and second operating positions. The first operating position corresponds to an open condition of the second valve means, while the second operating position corresponds to a closed condition of the second valve means. The tank means includes a vapor outlet port to which one end of the vapor conduit means is connected, such that the second operating position of the frame places the third filter means in communication with the vapor outlet port.

More particularly, the third filter means in a preferred form includes carbon particles sandwiched between two layers of a sponge-like filter material, which may comprise neoprene, and screen means for supporting the layered composition within the pivotable frame. Means in the form of a conduit is positioned on the third filter means for placing the latter in direct fluid communication with the vapor outlet port when the frame is in its second operating position.

In accordance with yet other aspects of the present invention, a conduit is connected between the valve cover of the engine and the vapor equalizer means for directing the oil blow-by to the vapor equalizer in order to minimize valve clatter. The tank means also preferably includes a copper conduit positioned in the bottom thereof which is connected in series with the cooling system of the motor vehicle for heating the tank and generating more vapor. A beneficial byproduct of the circulating system reduces the engine operating temperature to further improve operating efficiency.

BRIEF DESCRIPTION OF THE DRAWINGS

Various objects, features and attendant advantages of the present invention will be more fully appreciated as the same become better understood from the following detailed description of the present invention when considered in connection with the accompanying drawings, in which:

FIG. 2 is a cross-sectional view of one of the components of the preferred embodiment illustrated in FIG. 1 and taken along line 2—2 thereof;

FIG. 3 is a sectional view of the vapor tank illustrated in FIG. 2 and taken along line 3—3 thereof;

FIG. 4 is an enlarged sectional view illustrating in greater detail one component of the vapor tank shown in FIG. 3 and taken along line 4—4 thereof;

FIG. 5 is a perspective, partially sectional view illustrating a filter component of the vapor tank illustrated in FIG. 2;

FIG. 6 is a cross-sectional view of another component of the preferred embodiment of the present invention illustrated in FIG. 1 and taken along line 6—6 thereof;

FIG. 7 is a partial side, partial sectional view of the vapor equalizer illustrated in FIG. 6 and taken along line 7—7 thereof;

FIG. 8 is a side view illustrating the throttle linkage of the vapor equalizer shown in FIG. 7 and taken along line 8—8 thereof;

FIG. 9 is a longitudinal sectional view of another filter component of the preferred embodiment illustrated in FIG. 1;

FIG. 10 is a view of another component of the present invention; and

FIG. 11 is an exploded, perspective view which illustrates the main components of the filter portion of the vapor equalizer of the present invention.

DETAILED DESCRIPTION OF THE PREFERRED EMBODIMENT

Figure 1:
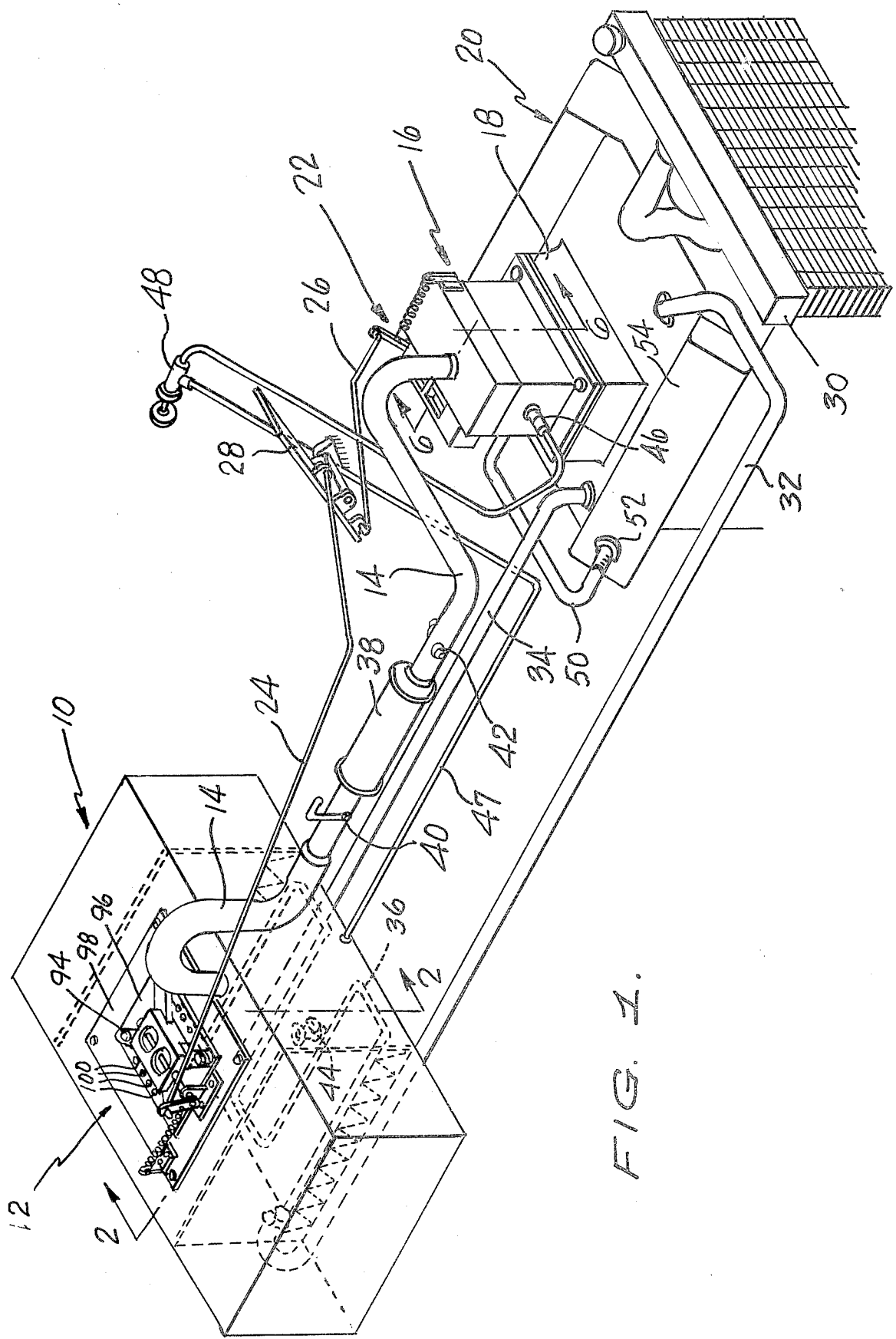
FIG. 1 is a perspective view illustrating the various components which together comprise a preferred embodiment of the present invention as installed in a motor vehicle.

Referring now to the drawings, wherein like reference numerals represent identical or corresponding parts throughout the several views, and more particularly to FIG. 1 thereof, there is illustrated a preferred embodiment of the present invention as installed in a motor vehicle.

The preferred embodiment includes as its main components a fuel vapor tank 10 in which the fuel vapor is stored and generated for subsequent delivery to the internal combustion engine 20. On the top of fuel vapor tank 10 is mounted an air inlet control valve which is indicated generally by reference numeral 12 and whose structure and operation will be described in greater detail hereinafter.

The internal combustion engine 20 includes a standard intake manifold 18. Mounted upon the intake manifold 18 is a vapor equalizer chamber 16. Connected between the fuel vapor tank 10 and the vapor equalizer chamber 16 is a vapor conduit or hose 14 for conducting the vapors from within tank 10 to the chamber 16.

Reference numeral 22 indicates generally an air inlet control valve which is mounted on the vapor equalizer chamber 16. Thus, the system is provided with two separate air inlet control valves 12 and 22 which are respectively coupled via cables 24 and 26 to the throttle control for the motor vehicle which may take the form of a standard accelerator pedal 28. The air inlet control valves 12 and 22 are synchronized in such a fashion that the opening of the air inlet control valve 22 of the vapor equalizer 16 always preceeds and exceeds the opening of the air inlet control valve 12 of the fuel vapor tank 10, for reasons which will become more clear hereinafter.

The cooling system of the vehicle conventionally includes a radiator 30 for storing liquid coolant that is circulated through the engine 20 in the well-known fashion. A pair of hoses 32 and 34 are preferably coupled into the normal heater lines from the engine 20 so as to direct heated liquid coolant from the engine 20 to a warming coil 36, preferably constructed of copper, which is positioned within vapor tank 10. I have found that the water circulation system consisting of hoses 32, 34 and 36 serves three distinct functions. Firstly, it prevents the vapor tank from reaching the cold temperatures to which it would otherwise be subjected as a result of high vacuum pressure and air flow therethrough. Secondly, the heated coolant serves to enhance vaporization of the gasoline stored within tank 10 by raising the temperature thereof. Thirdly, the liquid coolant, after leaving tank 10 via conduit 34, has been cooled to the point where engine 20 may then be run at substantially lower operating temperatures to further increase efficiency and prolong the life of the engine.

Included in series with vapor conduit 14 is a filter unit 38 which is designed to retard the flow of fuel vapor from the tank 10 to the vapor equalizer 16. The precise structure of the filter unit 38 will be described in greater detail hereinafter. A thrust adjustment valve 40 is positioned upstream of the filter unit 38 in conduit 14 and acts as a fine adjustment for the idling speed of the vehicle. Positioned on the other side of filter unit 38 in conduit 14 is a safety shut-off valve 42 which comprises a one-way valve. Starting the engine 20 will open the valve 42 to permit the engine vacuum pressure to be transmitted to tank 10, but, for example, a backfire will close the valve to prevent a possible explosion. The tank 10 may also be provided with a drain 44 positioned at the bottom thereof.

Positioned on the side of the vapor equalizer chamber 16 is a primer connection 46 which may be controlled by a dash mounted primer control knob 48 connected to tank 10 via conduit 47. A conduit 50 extends from the oil breather cap opening 52 in a valve cover 54 of the engine 20 to the vapor equalizer 16 to feed the oil blow-by to the engine as a means for eliminating valve clatter. This is believed necessary due to the extreme lean mixture of fuel vapor and air fed to the combustion cylinders of the engine 20 in accordance with the present invention.

Referring now to FIGS. 2 and 3, the fuel vapor tank 10 of the present invention is illustrated in greater detail in orthogonal sectional views and is seen to include a pair of side walls 56 and 58 which are preferably comprised of heavy duty steel plate (e.g. ⅛" thick) in order to withstand the high vacuum pressures developed therein. The tank 10 further comprises top wall 60 and bottom wall 62, and front and rear walls 64 and 66, respectively.

In the front wall 64 of tank 10 is positioned a coupling 68 for mating the heater hose 32 with the internal copper conduit 36. The tank 10 is also provided with a pair of vertically oriented planar support plates 70 and 72 which are positioned somewhat inwardly of the side walls 56 and 58 and are substantially parallel thereto. Support plates 70 and 72 lend structural integrity to the tank 10 and are also provided with a plurality of openings 74 (FIG. 2) at the bottom portions thereof to permit fluid communication therethrough. The bottom of the tank 10 is generally filled with from one to five gallons of gasoline, and the walls of the tank 10 along with plates 70 and 72 define three tank chambers 76, 78 and 80 which are, by virtue of openings 74, in fluid communication with one another.

In the top wall 60 of tank 10 is formed an opening 82 for placing one end of vapor conduit 14 in fluid communication with the interior chamber 76 of tank 10. A second opening 84 is positioned in the top wall 60 of tank 10 over which the air inlet control valve 12 is positioned. The valve assembly 12 comprises a pair of conventional butterfly valves 86 and 88 which are coupled via a control rod 90 to a control arm 92. Control arm 92 is, in turn, pivoted under the control of a cable 24 and is movable between a solid line position indicated in FIG. 2 by reference numeral 92 and a dotted line position indicated in FIG. 2 by reference numeral 92'.

Rod 90 and valves 86 and 88 are journaled in a housing 94 having a base plate 96 which is mounted on a cover 98. As seen in FIG. 1, the base plate 96 includes a plurality of small air intake ports or apertures 100 formed on both sides of the butterfly valves 86 and 88, which are utilized for a purpose to become more clear hereinafter.

Rod 90 is also journaled in a flange 102 which is mounted to cover 98, while a return spring 104 for control arm 92 is journaled to cover 98 via flange 106.

Extending through the baffle and support plates 70 and 72 from the side chambers 78 and 80 of tank 10 to be in fluid communication with apertures 100 are a pair of air conduits 108 and 110 each having a reed valve 112 and 114 positioned at the ends thereof for controlling air and vapor flow therethrough. The reed valves 112 and 114 cooperate with the small apertures 100 formed in the base plate 96 to provide the proper amount of air into the tank 10 while the engine is idling and the butterfly valves 86 and 88 are closed.

Mounted to the front wall 64 of tank 10 is a pivot support member 132 for pivotally receiving a filter element which is indicated generally by reference numeral 134 and is illustrated in a perspective, partially cut away view in FIG. 5. The unique, pivotable filter element 134 comprises a frame member 136 having a pin-receiving stub 138 extending along one side member thereof. The actual filter material contained within the frame 136 comprises a layer of carbon particles 148 which is sandwiched between a pair of layers of sponge-like filter material which may, for example, comprise neoprene. The neoprene layers 144 and 146 and carbon particles 148 are maintained in place by top and bottom screen elements 140 and 142 which extend within and are secured by frame member 136. A thick-walled rubber hose 150 having a central annulus 151 is secured to the top of screen 140 so as to mate with opening 82 of top wall 60 (see FIG. 2) when the filter assembly 134 is in its solid line operative position illustrated in FIG. 2. In the latter position, it may be appreciated that the vapor conduit 14 draws vapor fumes directly from the filter element 134, rather than from the interior portion 76 of tank 10. In contradistinction, when the filter element 134 is in its alternate operative position, indicated by dotted lines in FIG. 2, the vapor conduit 14 draws fumes mainly from the interior portions 76, 78 and 80 of tank 10.

FIG. 4 is an enlarged view of one of the reed valve assemblies 114 which illustrates the manner in which the valve opens and closes in response to the particular vacuum pressure created within the tank 10. The valves 112 and 114 are designed to admit just enough air to the tank 10 from the apertures 100 at engine idle to prevent the engine from stalling.

Referring now to FIGS. 6 through 8, the vapor equalizer chamber 16 of the present invention is seen to include front and rear walls 152 and 154, respectively, a top wall 156, a side wall 158, and another side wall 160. The vapor equalizer chamber 16 is secured to the manifold 18 as by a plurality of bolts 162 under which may be positioned a conventional gasket 164.

In the top wall 156 of the vapor equalizer 16 is formed an opening 166 for communicating the outlet end of vapor conduit 14 with a mixing and equalizing chamber 168. Adjacent the mixing and equalizing chamber 168 in wall 154 is formed another opening 170 which communicates with ambient air via opening 178 formed in the upper portion of housing 176. The amount of air admitted through openings 178 and 170 is controlled by a conventional butterfly valve 172. Butterfly valve 172 is rotated by a control rod 180 that, in turn, is coupled to a control arm 182. Cable 26 is connected to the distal end of control arm 182 and acts against the return bias of spring 184, the latter of which is journaled to side plate 152 of vapor equalizer 16 via an upstanding flange 188. Reference numeral 186 indicates generally a butterfly valve operating linkage, as illustrated more clearly in FIG. 8, and which is conventional as may be appreciated by a person of ordinary skill in the art.

Positioned below mixing and equalizing chamber 168 is a filter unit which is indicated generally by reference numeral 188. The filter unit 188, which is illustrated in an exploded view in FIG. 11, comprises a top plastic fluted cover 190 and a bottom plastic fluted cover 192. Positioned adjacent the top and bottom covers 190 and 192 are a pair of screen mesh elements 194 and 196, respectively. Positioned between the screen mesh elements 194 and 196 is a support member 198 which is preferably formed of a sponge-like filter material, such as, for example, neoprene. The support member 199 has formed on the top and bottom surfaces thereof a pair of receptacles 200 and 202, respectively, whose diameters are sized similarly to the opening 166 in top plate 156 and the openings formed in the intake manifold 18 which are respectively indicated by reference numerals 210 and 212 in FIG. 6.

Positioned in receptacles 200 and 202 are carbon particles 204 and 206, respectively, for vapor retardation and control purposes.

Referring now to FIG. 9, the filter unit 38 mounted in vapor conduit 14 is illustrated in a longitudinal sectional view and is seen to comprise an outer flexible cylindrical hose 214 which is adapted to connect with hose 14 at both ends by a pair of adapter elements 216 and 218. Contained within the outer flexible hose 214 is a cylindrical container 220, preferably of plastic, that houses in the central portion thereof a mixture of carbon and neoprene filter fibers 222. At both ends of the mixture 222 are deposited carbon particles 224 and 226, while the entire filtering unit is held within the container 220 by end screens 228 and 230 which permit passage of vapors therethrough while holding the carbon particles 224 and 226 in place.

FIG. 10 illustrates one form of the thrust adjustment valve 40 which is placed within line 14. The valve simply controls the amount of fluid passable through the conduit 14 via a rotating valve member 41.

In operation, the thrust adjustment valve 40 is initially adjusted to achieve as smooth an idle as possible for the particular motor vehicle in which the system is installed. The emergency shut-off valve 42, which is closed when the engine is off, generally traps enough vapor between it and the vapor equalizer 16 to start the engine 20. Initially, the rear intake valves 12 on the tank 10 are fully closed, while the air intake valves 22 on the equalizer 16 are open to admit a charge of air to the vapor equalizer prior to the vapor from the tank, thus forcing the pre-existing vapor in the vapor equalizer into the manifold. The small apertures 100 formed in base plate 96 on tank 10 admit just enough air to actuate the reed valves to permit sufficient vapor and air to be drawn through vapor conduit 14 and equalizer 16 to the engine 20 to provide smooth idling. The front air valves 22 are always set ahead of the rear air valves 12 and the linkages 24 and 26 are coupled to throttle pedal 28 such that the degree of opening of front valves 22 always exceeds the degree of opening of the rear valves 12.

Upon initial starting of the engine 20, due to the closed condition of rear valves 12, a high vacuum pressure is created within tank 10 which causes the filter assembly 134 positioned in tank 10 to rise to its operative position indicated by solid outline in FIG. 2. In this manner, a relatively small amount of vapor will be drawn directly from filter 134 through vapor conduit 14 to the engine to permit the latter to run on an extremely lean mixture.

Upon initial acceleration, the front air intake valve 22 will open further, while the rear butterfly assembly 12 will begin to open. The latter action will reduce the vacuum pressure within tank 10 whereby the filter assembly 134 will be lowered to its alternate operating position illustrated in dotted outline in FIG. 2. In this position, the lower end of the filter assembly 134 may actually rest in the liquid gasoline contained within the tank 10. Accordingly, upon acceleration, the filter assembly 134 is moved out of direct fluid communication with the opening 82 such that the vapor conduit 14 then draws fuel vapor and air from the entire tank 10 to provide a richer combustion mixture to the engine, which is necessary during acceleration.

When the motor vehicle attains a steady speed, and the operator eases off the accelerator pedal 28, the rear butterfly valve assembly 12 closes, but the front air intake 22 remains open to a certain degree. The closing of the rear air intake 12 increases the vacuum pressure within tank 10 to the point where the filter assembly 134 is drawn up to its initial operating position. As illustrated, in this position, the opening 82 is in substantial alignment with the aperture 151 of hose 150 to place the filter unit 134 in direct fluid communication with the vapor conduit 14, thereby lessening the amount of vapor and air mixture fed to the engine. Any vapor fed through conduit 14 while the filter 134 is at this position is believed to be drawn directly off the filter unit itself.

I have been able to obtain extremely high gas mileages with the system of the present invention installed on a V-8 engine of a conventional 1971 American made automobile. In fact, mileage rates in excess of one hundred miles per gallon have been achieved with the present invention. The present invention eliminates the need for conventional fuel pumps, carburetors, and gas tanks, thereby more than offsetting whatever the components of the present invention might otherwise add to the cost of a car. The system may be constructed with readily available components and technology, and may be supplied in kit form as well as original equipment.

Obviously, numerous modifications and variations of the present invention are possible in light of the above teachings. For example, although described in connection with the operation of a motor vehicle, the present invention may be universally applied to any four-stroke engine for which its operation depends upon the internal combustion of fossil fuels. Therefore, it is to be understood that within the scope of the appended claims the invention may be practiced otherwise than as specifically described herein.

I claim as my invention:

1. A fuel vapor system for an internal combustion engine having an intake manifold, which comprises:
   (a) tank means for containing fuel vapor;
   (b) vapor equalizer means mounted on and in fluid communication with said intake manifold of said engine;
   (c) vapor conduit means connecting said tank means to said vapor equalizer means for delivering fuel vapor from the former to the latter;
   (d) said vapor equalizer means having first valve means connected thereto for controlling the admission of air to said vapor equalizer means;
   (e) said tank means having second valve means connected thereto for controlling the admission of air to said tank means; and
   (f) throttle means for controlling said first and second valve means so that the opening of said first valve means precedes and exceeds the opening of said second valve means.

2. The fuel vapor system as set forth in claim 1, further comprising filter means positioned in said vapor conduit means for retarding the flow of said fuel vapor from said tank means to said vapor equalizer means.

3. The fuel vapor system as set forth in claim 2, wherein said filter means comprises carbon particles.

4. The fuel vapor system as set forth in claim 2, wherein said filter means comprises carbon particles and neoprene fibers.

5. The fuel vapor system as set forth in claim 2, wherein said filter means comprises a substantially tubular housing positioned in series in said vapor conduit means, said housing containing a central portion comprising a mixture of carbon and neoprene and end portions comprising carbon positioned on each side of said central portion.

6. The fuel vapor system as set forth in claim 1, further comprising filter means positioned in said vapor equalizer means for retarding the flow of said fuel vapor to said engine intake manifold.

7. The fuel vapor system as set forth in claim 6, wherein said filter means is positioned downstream of said first valve means.

8. The fuel vapor system as set forth in claim 7, wherein said filter means comprises carbon particles.

9. The fuel vapor system as set forth in claim 8, wherein said filter means further comprises a porous support member having first and second recessed portions for containing said carbon particles, said first recessed portion positioned opposite a vapor inlet port in said vapor equalizer means to which said vapor conduit means is connected, said second recessed portion positioned opposite said intake manifold of said engine.

10. The fuel vapor system as set forth in claim 9, wherein said porous support member comprises neoprene.

11. The fuel vapor system as set forth in claim 1, further comprising filter means positioned in said tank means for controlling the flow of fuel vapor into said vapor conduit means in proportion to the degree of vacuum in said tank means.

12. The fuel vapor system as set forth in claim 11, wherein said filter means comprises means for reducing the amount of fuel vapor delivered to said vapor conduit means when said engine is idling and when said engine has attained a steady speed.

13. The fuel vapor system as set forth in claim 12, wherein said throttle means acts to close said second valve means when said engine is idling and when said engine has attained a steady speed to thereby increase the vacuum pressure in said tank means.

14. The fuel vapor system as set forth in claim 13, wherein said filter means comprises frame means pivotally mounted within said tank means and movable between first and second operating positions, said first operating position corresponding to an open condition of said second valve means, said second operating position corresponding to a closed condition of said second valve means.

15. The fuel vapor system as set forth in claim 14, wherein said tank means includes a vapor outlet port to which one end of said vapor conduit means is connected, and wherein said second operating position of said frame means places said filter means in direct fluid communication with said vapor outlet port.

16. The fuel vapor system as set forth in claim 15, wherein said filter means includes carbon particles.

17. The fuel vapor system as set forth in claim 16, wherein said filter means further includes neoprene filter material.

18. The fuel vapor system as set forth in claim 17, wherein said filter means comprises a layer of said carbon particles sandwiched between two layers of said neoprene filter material, and screen means for supporting same within said pivotable frame means.

19. The fuel vapor system as set forth in claim 18, further comprising means positioned on said filter means for placing the latter in direct fluid communication with said vapor outlet port when said frame means is in said second operation position.

20. A fuel vapor system for an internal combustion engine having an intake manifold, which comprises:
   (a) tank means for containing fuel vapor;
   (b) vapor equalizer means mounted on and in fluid communication with said intake manifold of said engine;
   (c) vapor conduit means connecting said tank means to said vapor equalizer means for delivering fuel vapor from the former to the latter;
   (d) said vapor equalizer means having first valve means connected thereto for controlling the admission of air to said vapor equalizer means;
   (e) said tank means having second valve means connected thereto for controlling the admission of air to said tank means; and
   (f) filter means positioned in said vapor conduit means for retarding the flow of said fuel vapor from said tank means to said vapor equalizer means.

21. The fuel vapor system as set forth in claim 20, wherein said filter means comprises a substantially tubular housing positioned in series in said vapor conduit means, said housing containing a central portion comprising a mixture of carbon and neoprene and end portions comprising carbon positioned on each side of said central portion.

22. A fuel vapor system for an internal combustion engine having an intake manifold, which comprises:
   (a) tank means for containing fuel vapor;
   (b) vapor equalizer means mounted on and in fluid communication with said intake manifold of said engine;
   (c) vapor conduit means connecting said tank means to said vapor equalizer means for delivering fuel vapor from the former to the latter;
   (d) said vapor equalizer means having first valve means connected thereto for controlling the admission of air to said vapor equalizer means;
   (e) said tank means having second valve means connected thereto for controlling the admission of air to said tank means; and
   (f) filter means positioned in said vapor equalizer means for retarding the flow of said fuel vapor to said engine intake manifold.

23. The fuel vapor system as set forth in claim 22, wherein said filter means is positioned downstream of said first valve means, said filter means comprises carbon particles and a porous support member having first and second recessed portions for containing said carbon particles, said first recessed portion positioned opposite a vapor inlet port in said vapor equalizer means to which said vapor conduit means is connected, said second recessed portion positioned opposite said intake manifold of said engine, and wherein said porous support member comprises neoprene.

24. A fuel vapor system for an internal combustion engine having an intake manifold, which comprises:
   (a) tank means for containing fuel vapor;
   (b) vapor equalizer means mounted on and in fluid communication with said intake manifold of said engine;
   (c) vapor conduit means connecting said tank means to said vapor equalizer means for delivering fuel vapor from the former to the latter;
   (d) said vapor equalizer means having first valve means connected thereto for controlling the admission of air to said vapor equalizer means;
   (e) said tank means having second valve means connected thereto for controlling the admission of air to said tank means; and
   (f) filter means movably positioned in said tank means for controlling the flow of fuel vapor into said vapor conduit means in proportion to the degree of vacuum in said tank means.

25. The fuel vapor system as set forth in claim 24, further comprising throttle means for closing said second valve means when said engine is idling and when said engine has attained a steady speed to thereby increase the vacuum pressure in said tank means.

26. A fuel vapor system for an internal combustion engine having an intake manifold, which comprises:
   (a) tank means for containing fuel vapor;
   (b) vapor equalizer means mounted on and in fluid communication with said intake manifold of said engine;
   (c) vapor conduit means connecting said tank means to said vapor equalizer means for delivering fuel vapor from the former to the latter;
   (d) said vapor equalizer means having first valve means connected thereto for controlling the admission of air to said vapor equalizer means;
   (e) said tank means having second valve means connected thereto for controlling the admission of air to said tank means;
   (f) filter means positioned in said tank means for controlling the flow of fuel vapor into said vapor conduit means in proportion to the degree of vacuum in said tank means; and
   (g) throttle means for closing said second valve means when said engine is idling and when said engine has attained a steady speed to thereby increase the vacuum pressure in said tank means;
   wherein said filter means comprises frame means pivotally mounted within said tank means and movable between first and second operating positions, said first operating position corresponding to an open condition of said second valve means, said second operating position corresponding to a closed condition of said second valve means.

27. The fuel vapor system as set forth in claim 26, wherein said tank means includes a vapor outlet port to which one end of said vapor conduit means is connected, and wherein said second operating position of said frame means places said filter means in direct fluid communication with said vapor outlet port.

28. The fuel vapor system as set forth in claim 27, wherein said filter means comprises a layer of carbon particles sandwiched between two layers of neoprene filter material, and screen means for supporting same within said pivotable frame means.

29. A fuel vapor system for an internal combustion engine having an intake manifold, which comprises:
   (a) tank means for containing fuel vapor;
   (b) vapor equalizer means mounted on and in fluid communication with said intake manifold of said engine;
   (c) vapor conduit means connecting said tank means to said vapor equalizer means for delivering fuel vapor from the former to the latter;
   (d) said vapor equalizer means having first valve means connected thereto for controlling the admission of air to said vapor equalizer means;
   (e) said tank means having second valve means connected thereto for controlling the admission of air to said tank means;
   (f) first filter means positioned in said vapor conduit means for retarding the flow of said fuel vapor from said tank means to said vapor equalizer means;
   (g) second filter means positioned in said vapor equalizer means for retarding the flow of said fuel vapor to said engine intake manifold; and
   (h) third filter means positioned in said tank means for controlling the flow of fuel vapor into said vapor conduit means in proportion to the degree of vacuum in said tank means.

30. The fuel vapor system as set forth in claim 29, further comprising throttle means for controlling said first and second valve means so that the opening of said first valve means preceeds and exceeds the opening of said second valve means.

31. The fuel vapor system as set forth in claim 1, further comprising conduit means connected between a valve cover of said engine and said vapor equalizer means for conducting the oil blow-by to said vapor equalizer means.

32. The fuel vapor system as set forth in claim 1, wherein said engine includes a circulating liquid cooling system, and further comprising conduit means positioned within said tank means and connected in series to said cooling system for heating said tank means.

* * * * *